United States Patent [19]

Robeson

[11] 4,440,890

[45] Apr. 3, 1984

[54] FLAME RETARDANT POLY(ARYL KETONE)

[75] Inventor: Lloyd M. Robeson, Whitehouse Station, N.J.

[73] Assignee: Union Carbide Corporation, Danbury, Conn.

[21] Appl. No.: 506,392

[22] Filed: Jun. 21, 1983

[51] Int. Cl.³ ............................................. C08K 5/42
[52] U.S. Cl. ................................. 524/159; 524/160; 524/161; 524/162; 524/163; 524/164; 524/166; 524/371
[58] Field of Search ............... 524/159, 160, 161, 162, 524/163, 164, 166, 371; 528/126, 127

[56] References Cited

U.S. PATENT DOCUMENTS

| | | |
|---|---|---|
| 3,931,100 | 1/1976 | Mark ................................. 524/159 |
| 3,940,366 | 2/1976 | Mark ................................. 524/159 |
| 3,978,024 | 8/1976 | Mark ................................. 524/162 |
| 4,007,155 | 2/1977 | Mark ................................. 524/162 |
| 4,032,506 | 6/1977 | Mark ................................. 524/162 |
| 4,067,846 | 1/1978 | Mark ................................. 524/162 |
| 4,104,246 | 8/1978 | Mark ................................. 524/162 |
| 4,115,354 | 9/1978 | Mark et al. ...................... 524/162 |
| 4,206,110 | 6/1980 | Reese et al. .................... 524/159 |
| 4,239,678 | 12/1980 | Williams ......................... 524/162 |
| 4,263,201 | 4/1981 | Mark et al. ..................... 524/159 |
| 4,380,598 | 4/1983 | Robeson et al. ................ 524/163 |

*Primary Examiner*—Veronica P. Hoke
*Attorney, Agent, or Firm*—Donald M. Papuga

[57] ABSTRACT

Described herein is a flame retardant molding composition comprising a particular poly(aryl ketone) and a flame retardant additive which is a metal salt of an aromatic sulfonic acid.

21 Claims, No Drawings

FLAME RETARDANT POLY(ARYL KETONE)

BACKGROUND OF THE INVENTION

This invention is directed to a flame retardant molding composition comprising a particular poly(aryl ketone) and a flame retardant additive which is a metal salt of an aromatic sulfonic acid.

Poly(aryl ketone)s are a relatively new class of engineering polymers. Several poly(aryl ketone)s are crystalline. Two of these crystalline poly(aryl ketones) are commercially available and are of the following structure:

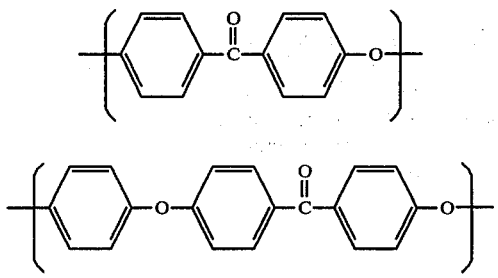

These poly(aryl ketone's) exhibit an excellent combination of properties, i.e., excellent thermal and hydrolytic stability, high strength and toughness, excellent wear and abrasion resistance and excellent solvent resistance. Thus articles molded from poly(aryl ketone)s have utility where high performance is required.

However, in many instances, it is required that the articles be flame resistant or flame retardant. Unmodified poly(aryl ketone) exhibits favorable flammability ratings necessary for certain end-use applications. However, under certain stringent conditions of use a poly(aryl ketone) exhibiting increased flame retardance is desirable.

It has now been found that poly(aryl ketone)s are rendered flame retardant by admixing therewith a flame retarding amount of a metal salt of an aromatic sulfonic acid.

THE INVENTION

According to the present invention there is provided a flame retardant molding composition comprising a poly(aryl ketone) and a flame retarding amount of a metal salt of an aromatic sulfonic acid.

The poly(aryl ketone) is used in the blend in amounts of from about 20 to about 99.95, preferably from about 40 to about 99.80 parts by weight and the flame retardant additive is used in amounts of from about 0.05 to about 10, preferably from about 0.1 to about 2.0 parts by weight.

The poly(aryl ketone)s which are suitable for use herein contain repeating units of the following formula:

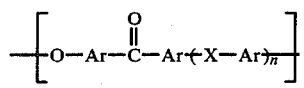

wherein Ar is independently a divalent aromatic radical selected from phenylene, biphenylene or naphthylene, X is independently O,

or a direct bond, and n is an integer of from 0 to 3.

Preferably, the poly(aryl ketone) contains repeating units of the following formula:

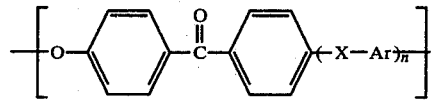

wherein Ar, X, and n are as previously defined.

The most preferred poly(aryl ketone)s have repeating units of the formula:

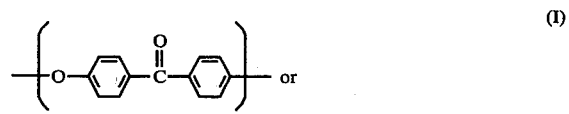

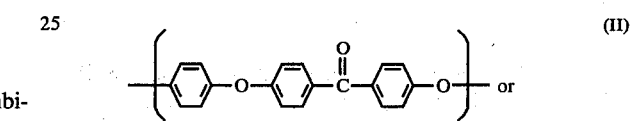

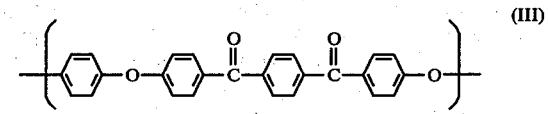

These poly(aryl ketone)s are prepared by methods well known in the art, such as by heating a substantially equimolar mixture of at least one bisphenol and at least one dihalobenzoid compound or at least one halophenol compound. Preferred bisphenols include:
hydroquinone,
4,4'-dihydroxybenzophenone,
4,4'-dihydroxybiphenyl,
4,4'-dihydroxydiphenyl ether and
2,2'-bis (4-hydroxyphenyl) propane.

Preferred dihalo and dihalobenzoid compounds include:
4-(4-chlorobenzoyl)phenol,
4,4'-difluorobenzophenone,
4,4'-dichlorobenzophenone,
4-chloro-4'-fluorobenzophenone,

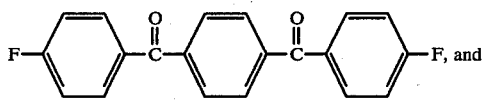

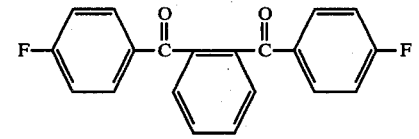

The poly(aryl ketone)s may be produced by the process as described in U.S. Pat. No. 4,176,222. This process comprises heating in the temperature range of 100° to 400° C., (i) a substantially equimolar mixture of (a) at least one bisphenol and (b) at least one dihalobenzoid compound, or (ii) at least one halophenol, in which in the dihalobenzoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Poly(aryl ketone)s containing repeating units of the following formula:

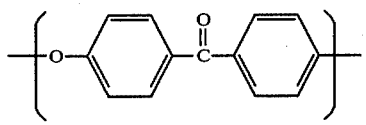

may also be prepared by methods described in U.S. Pat. No. 3,953,400. This process comprises polymerizing monomers reactive under Friedel-Crafts acylating conditions in the presence of an aromatic capping agent whose rate of acylation relative to benzene is greater than 150. The polymerization is generally catalyzed by boron trifluoride.

The term poly(aryl ketone) is meant to include homopolymers, copolymers, terpolymers, and the like.

The poly(aryl ketone)s have a reduced viscosity of at least about 0.6 to about 3.0, as measured in concentrated sulphuric acid at 25° C.

The metal salt of an aromatic sulfonic acid flame retardant additive which may be used in this invention is selected from metal salts of sulfonic acids of aromatic sulfones, metal salts of cycloaliphatically substituted aromatic sulfonic acids, metal salts of heterocyclic aromatic sulfonic salts, metal salts of sulfonic acids of aromatic ketones, metal salts of either monomeric or polymeric aromatic sulfonic acids, metal salts of either monomeric or polymeric aromatic ether sulfonic acids, metal salts of monomeric and polymeric carboxyl or ester substituted aromatic sulfonic acids, metal salts of either monomeric or polymeric phenol ester sulfonic acids, metal salts of sulfonic acids of aromatic sulfoxides, and mixtures thereof. These sulfonic acids may additionally be substituted with electron withdrawing radicals such as halo-, nitro-, trihalomethyl and cyano. The metal is selected from an alkali or an alkaline earth metal, preferably sodium, potassium or calcium. These metal salts are well known in the art and are described in, for example, U.S. Pat. Nos. 3,909,490; 3,917,559; 3,916,167; 3,926,908; 3,940,366; 3,951,910; 3,953,396; 3,953,399; 3,933,734; and 3,978,024.

The preferred flame retardant additives are of the following formula:

A$_1$SO$_3^-$M$^+$, and/or (A$_1$SO$_3^-$)$_2$M$^{++}$ wherein A$_1$ is an aromatic monomeric or polymeric radical, M$^+$ is an alkali metal ion and M$^{++}$ is an alkaline earth metal ion. The aromatic radical may be substituted or unsubstituted and should contain at least 6 carbon atoms. The preferred substituents are electron withdrawing radicals such as halo-, trihalomethyl or cyano, preferably halo- selected from chlorine, bromine or fluorine. Preferably, A$_1$ is selected from:

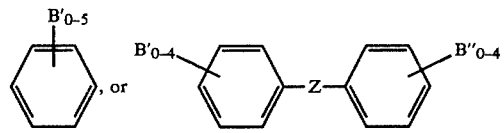

wherein Z is selected from a direct bond, O, CO, S, SO$_2$ or OSO$_2$ and B' and B" are independently chlorine, bromine, fluorine, trihalomethyl, cyano, nitro, or aliphatic groups (i.e., methyl, ethyl, propyl, etc.).

The preferred flame retardant additives are of the following formula:

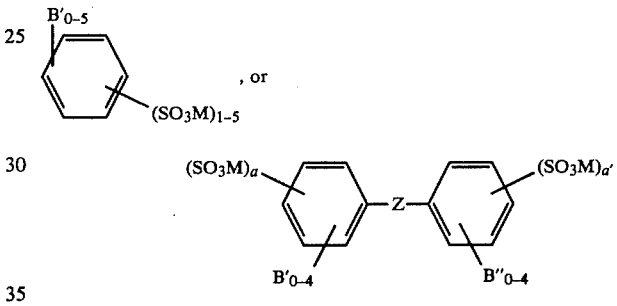

wherein M, B', B", and Z are as previously defined and a and a' are independently 0–4 with the proviso that a least one of a or a' is 1.

The most preferred flame retardant additives are of the following formula:

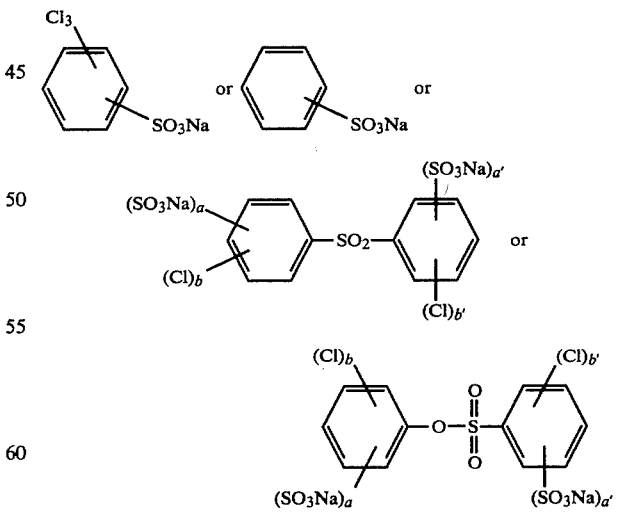

wherein a, a', b and b' are independently 0 to 4 with the proviso that at least one of a or a' and b or b' is 1.

The metal salts of the aromatic sulfonic acids may be used together with other flame retardant additives, such as a metal salt of aliphatic and olefinic sulfonic acids as described in U.S. Pat. No. 3,931,000, inorganic phosphates or a halogen source, such as an inorganic halide, or halogenated alkali metal salts or alkaline earth metal salts of aliphatic, aromatic or cycloaliphatic carboxylic or sulfonic acids. The halogenated alkali metal salts or alkaline earth metal salts are known in the art and are described, for example, in U.S. Pat. No. 4,104,253. Also, halogenated aromatic compounds may be included, such as decabromodiphenyl oxide, phosphate esters, and the like.

Other additives may be included in the composition of this invention. These additives include plasticizers; pigments; reinforcing agents, such as glass fibers; thermal stabilizers; ultraviolet light stabilizers, processing aids, flame retardant synergists, such as $Sb_2O_3$ and zinc borate, and the like.

Also, other polymers exhibiting mechanical compatibility with the poly(aryl ketone) may be added to the composition. There polymers include poly(phenylene sulfide), poly(aryl ethers), and polysulfone. These polymers are blended with the poly(aryl ketone) by conventional methods.

The compositions of this invention are prepared by any conventional mixing methods. For example, a preferred method comprises mixing the poly(aryl ketone), flame retardant additive in powder or granular form in an extruder and extruding the mixture into strands, chopping the strands into pellets and molding the pellets into the desired article.

EXAMPLES

The following examples serve to give specific illustrations of the practice of this invention but they are not intended in any way to limit the scope of this invention.

The following designations used in the Examples have the following meaning:

Flame retardant 1—2,4,5 trichlorobenzene sulfonic acid, $K^+$ salt.
Flame retardant 2—benzene sulfonic acid, $Na^+$ salt.
Flame retardant 3—toluene sulfonic acid, $Na^+$ salt.
Poly(aryl ketone)—a polymer containing repeat units of the following formula:

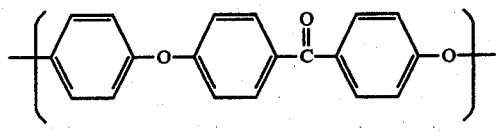

having a reduced viscosity of 1.2 as measured in a 96 percent sulfuric acid solution (one percent polymer solution) at 25° C.

CONTROL

The Poly(aryl ketone) was compression molded at 350° to 360° C. into a 20 mil thick test specimen. The specimens were subjected to the UL-94 Burning Test for Classifying Materials. The UL-94 ratings of V-0, V-1, or V-2 are determined as designated below:

"94 V-0": No single flaming combustion after removal of the igniting flame shall exceed 10 seconds and none of the specimens shall drip flaming particles which ignite absorbent surgical cotton placed 12 inches below the specimen. Total flame out time for all five specimens (10 ignitions) cannot exceed 50 seconds.

"94 V-1": No single flame combustion after removal of the igniting flame shall exceed 30 seconds and none of the specimens shall drip flaming particles which ignite absorbent surgical cotton placed 12 inches below the specimen. Total flame out time for all five specimens (10 ignitions) cannot exceed 250 seconds.

"94 V-2": No single flaming combustion after removal of the igniting flame shall exceed 30 seconds. The specimens drip flaming particles which burn only briefly, some of which ignite absorbent surgical cotton placed 12 inches below the specimen. Total flame out time for all five specimens (10 ignitions) cannot exceed 250 seconds.

In addition, a test bar which continues to burn for more than 30 seconds after removal of the igniting flame is classified as "burns." Six specimens were utilized for the test data reported instead of the five reported for the test procedure.

The results are shown in Table 1.

EXAMPLE 1

99 weight percent of the Poly(aryl ketone) of the Control was blended with 1 weight percent of Flame retardant 1 in a Brabender blender at 350° to 360° C. The blend was then compression molded and tested by the procedure as described in the Control.

The results are shown in Table I.

EXAMPLE 2

98 weight percent of the Poly(aryl ketone) of the Control was blended with 2 weight percent of Flame retardant 2 as described in Example 1. The blend was then compression molded and tested by the procedure as described in the Control.

The results are shown in Table I.

EXAMPLE 3

98 weight percent of the Poly(aryl ketone) of the Control was blended with 2 weight percent of Flame retardant 3 as described in Example 1. The blend was then compression molded and tested by the procedure as described in the Control.

The results are shown in Table I.

TABLE I

| Example | Description of the Composition | | Thickness of the sample (mils) | FIRST IGNITION | | SECOND IGNITION | | UL-94 Rating |
| | Polymer[1] (wt. %) | Additive (wt. %) | | Average Flaming Time (Seconds) | Total Flaming Drips | Average Flaming Time (Seconds) | Total Flaming Drips | |
|---|---|---|---|---|---|---|---|---|
| Control | PAK | 0 | 21 | 12.0 | 0 | 9.8 | 0 | V-1 |
| 1 | PAK (99) | Flame-retardant-1 (1) | 21 | 2.3 | 0 | 3.8 | 0 | V-0 |
| 2 | PAK (98) | Flame-retardant-2 (2) | 21 | 3.3 | 0 | 3.5 | 0 | V-0 |
| 3 | PAK (98) | Flame-retardant-3 (2) | 18 | 5.3 | 0 | 4.2 | 0 | V-0 |

[1]PAK = Poly(aryl ketone)

EXAMPLE 4

A blend of 58.8 grams of the poly(aryl ketone) of control A and 1.2 grams of p-chloro benzene sulfonic acid $Na^+$ salt was prepared in a Brabender blender at 350° C. The resultant mixture was compression molded in a 8×8×0.020 inch cavity mold. Samples were cut out for testing as per UL-94. The average thickness of the samples (6) was 18.3 mils. The average burn time after the 1st ignition was 2.8 seconds, and the average burn time after the second ignition was 2.7 seconds. No flaming drips were observed and this product is rated V-O.

EXAMPLE 5

A blend of 58.8 grams of the poly(aryl ketone) of Control A and 1.2 grams of a sulfonated 4,4'dichlorodiphenyl sulfone Na+ salt prepared as described in U.S. Pat. No. 4,380,598 (product from 60 grams of 4,4'dichlorodiphenyl sulfone dissolved in 200 ml. of concentrated sulfuric acid (94–96%) and heated to 200° C. for 2 hours) was prepared in a Brabender blender at 350° C. The resultant mixture was compression molded in a 8×8×0.020 inch cavity mold. Samples were cut out for testing as per UL-94. The average thickness of the samples (6) was 19.5 mils. The average burn time after the 1st ignition was 2.8 seconds, and the average burn time after the second ignition was 3.0 seconds. No flaming drips were observed; and this product is rated V-O.

What is claimed:

1. A flame retardant molding composition comprising:
   (a) a poly(aryl ketone) of the following formula:

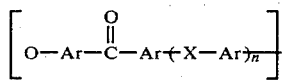

wherein Ar is independently a divalent aromatic radical selected from phenylene, biphenylene or naphthylene, X is independently O,

or a direct bond, and n is an integer of from 0 to 3, and
   (b) a flame retarding amount of an alkali or alkaline earth metal salt of an aromatic sulfonic acid.

2. A composition as defined in claim 1 wherein the poly(aryl ketone) is of the following formula:

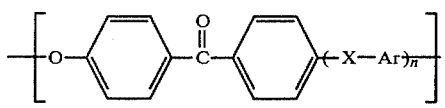

wherein Ar is independently a divalent aromatic radical selected from phenylene, biphenylene, or naphthylene, X is independently O,

or a direct bond and n is an integer of from 0 to 3.

3. A composition as defined in claim 1 wherein the poly(aryl ketone) has repeating units of the formula:

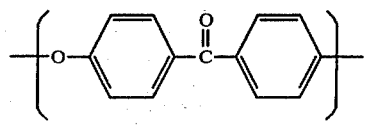

4. A composition defined in claim 1 wherein the poly(aryl ketone) has repeating units of the formula:

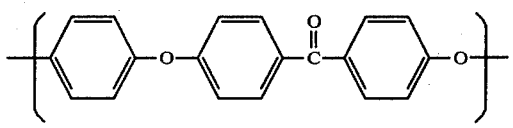

5. A composition as defined in claim 1 wherein the poly(aryl ketone) has repeating units of the formula:

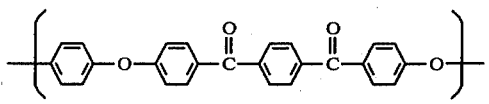

6. A composition as defined in claim 1 wherein the metal salt of the aromatic sulfonic acid is selected from an alkali or an alkaline earth metal salt of sulfonic acids of aromatic sulfones, cycloaliphatically substituted aromatic sulfonic acids, heterocyclic aromatic sulfonic acids, sulfonic acids of aromatic ketones, either monomeric or polymeric aromatic sulfonic acids, either monomeric or polymeric aromatic ether sulfonic acids, monomeric and polymeric carboxy or ester substituted aromatic sulfonic acids, either monomeric or polymeric phenol ester sulfonic acids, sulfonic acids of aromatic sulfoxides, and mixtures thereof.

7. A composition as defined in claim 6 wherein the metal salt is substituted by an electron withdrawing radical.

8. A composition as defined in claim 7 wherein the electron withdrawing radical is a halo, nitro, trihalomethyl or cyano radical.

9. A composition as defined in claims 1 or 5 wherein the metal salt of the aromatic sulfonic acid is of the following formula:

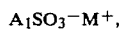

and/or

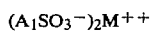

wherein $A_1$ is a substituted or unsubstituted aromatic monomeric or polymeric radical containing at least 6 carbon atoms, $M^+$ is an alkali metal ion and $M^{++}$ is an alkaline earth metal ion.

10. A composition as defined in claim 9 wherein the substituent on the substituted aromatic radical is an electron withdrawing radical selected from halo, nitro, trifluoromethyl or cyano radicals.

11. A composition as defined in claim 9 wherein $A_1$ is selected from the following formulae:

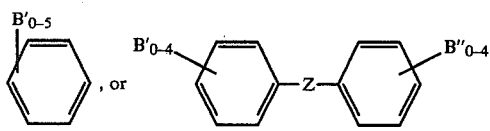

wherein Z is selected fron a direct bond, O, CO, S, SO₂ or OSO₂ and B' and B" are independently chlorine, bromine, fluorine, trihalomethyl, cyano, nitro, or aliphatic groups.

12. A composition as defined in claims 1 or 9 wherein the metal salt of the aromatic sulfonic acid is selected from the following formulae:

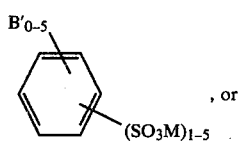

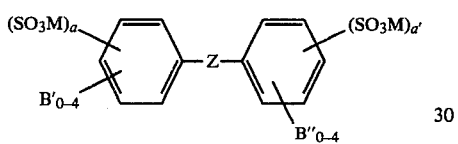

wherein Z is selected from a direct bond, O, CO, S, SO₂ or OSO₂ and B' is independently chlorine, bromine, fluorine, trihalomethyl, cyano or nitro, M is an alkali metal ion and a and a' are independently 0-4 with the proviso that at least one of a or a' is 1.

13. A composition as defined in claim 12 wherein the metal salt of the aromatic sulfonic acid is of the following formula:

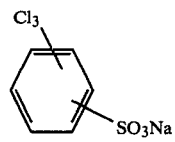

14. A composition as defined in claim 12 wherein the metal salt of the aromatic sulfonic acid is of the following formula:

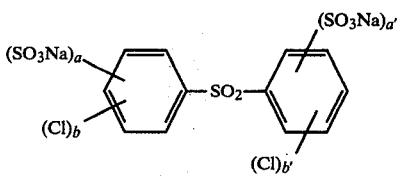

15. A composition as defined in claim 12 wherein the metal salt of the aromatic sulfonic acid is of the following formula:

wherein a, a', b and b' are independently 0 to 4 with the proviso that at least one of a and a' and b and b' is 1.

16. A composition as defined in claim 12 wherein the metal salt of the aromatic sulfonic acid is of the following formula:

wherein a, a', b and b' are independently 0 to 4 with the proviso that at least one of a and a' and b and b' is 1.

17. A composition as defined in claim 1 wherein the composition contains a metal salt of an aliphatic and olefinic sulfonic acid or a halogen source selected from an inorganic halide, or a halogenated organic alkali metal salt or an alkaline earth metal salt of aliphatic, aromatic or cycloaliphatic carboxylic or sulfonic acids.

18. A composition as defined in claims 1 or 6 or 9 wherein the metal salt of the aromatic sulfonic acid is present in amounts of from about 0.05 to about 10 weight percent.

19. A composition as defined in claims 1 or 6 or 9 wherein the composition contains decabromodiphenyl oxide.

20. A composition as defined in claim 1 which contains a polymer exhibiting mechanical compatibility with the poly(aryl ketone).

21. A composition as defined in claim 20 wherein the polymer is selected from a poly(phenylene sulfide), a poly(aryl ether), or a polysulfone.

* * * * *